United States Patent
Hsiao et al.

(10) Patent No.: US 10,956,487 B2
(45) Date of Patent: Mar. 23, 2021

(54) METHOD FOR ESTABLISHING AND PROCESSING CROSS-LANGUAGE INFORMATION AND CROSS-LANGUAGE INFORMATION SYSTEM

(71) Applicant: INDUSTRIAL TECHNOLOGY RESEARCH INSTITUTE, Hsinchu (TW)

(72) Inventors: Oneil Hsiao, Taipei (TW); Jared Liang, Taichung (TW); Sheng-Hsuan Chen, Taichung (TW); Tao-Ting Hsu, Kaohsiung (TW); Ya Fang Tsai, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 148 days.

(21) Appl. No.: 16/232,438

(22) Filed: Dec. 26, 2018

(65) Prior Publication Data

US 2020/0210471 A1 Jul. 2, 2020

(51) Int. Cl.
*G06F 16/00* (2019.01)
*G06F 16/55* (2019.01)
(Continued)

(52) U.S. Cl.
CPC ............ *G06F 16/55* (2019.01); *G06F 16/583* (2019.01); *G06F 16/9538* (2019.01); *G06F 40/53* (2020.01)

(58) Field of Classification Search
CPC .... G06F 16/55; G06F 16/583; G06F 16/9538; G06F 40/53
See application file for complete search history.

(56) References Cited

U.S. PATENT DOCUMENTS 9,449,070 B2  9/2016 Mishra
9,704,054 B1 * 7/2017 Tappen ................ G06K 9/6281
(Continued)

FOREIGN PATENT DOCUMENTS

CN  101329677 A  12/2008
CN  103714481 A   4/2014
(Continued)

OTHER PUBLICATIONS

Taiwan Patent Office, "Office Action", dated Oct. 22, 2019, Taiwan.

*Primary Examiner* — Shiow-Jy Fan
(74) *Attorney, Agent, or Firm* — Locke Lord LLP; Tim Tingkang Xia, Esq.

(57) ABSTRACT

A method for establishing cross-language information is disclosed. The method includes steps of collecting a plurality of set of object information from a plurality of network platforms; building a first data structure corresponding to a source language and a second data structure corresponding to a target language according to the plurality of sets of object information; classifying a plurality of sets of first object information in the first data structure into a plurality of source image groups according characteristics of the plurality of sets of first object information; classifying a plurality of sets of second object information in the second data structure into a plurality of target image groups according to characteristics of the plurality of sets of second object information; wherein each source image group includes a plurality of source hashtag groups, and each target image group includes a plurality of target hashtag groups.

17 Claims, 4 Drawing Sheets

(51) Int. Cl.
*G06F 16/9538* (2019.01)
*G06F 16/583* (2019.01)
*G06F 40/53* (2020.01)

(56) References Cited

U.S. PATENT DOCUMENTS

| | | | |
|---|---|---|---|
| 10,684,738 B1* | 6/2020 | Sicora | G06F 3/04817 |
| 2008/0052126 A1 | 2/2008 | Sasai et al. | |
| 2010/0064254 A1* | 3/2010 | Atsmon | G06F 3/0482 |
| | | | 715/810 |
| 2011/0085697 A1 | 4/2011 | Clippard et al. | |
| 2015/0172396 A1* | 6/2015 | Longo | H04L 51/20 |
| | | | 709/204 |
| 2016/0026900 A1* | 1/2016 | Ando | G06K 9/4642 |
| | | | 382/159 |
| 2016/0132750 A1 | 5/2016 | Yang et al. | |
| 2017/0293611 A1 | 10/2017 | Tu et al. | |
| 2018/0052842 A1 | 2/2018 | Hewavitharana et al. | |
| 2018/0089722 A1* | 3/2018 | Schulte | G06F 3/0482 |
| 2018/0108443 A1 | 4/2018 | Li | |
| 2018/0199025 A1* | 7/2018 | Holzer | G06K 9/00664 |
| 2018/0260385 A1* | 9/2018 | Fan | G06F 40/274 |
| 2020/0104316 A1* | 4/2020 | Dimson | G06F 16/5838 |

FOREIGN PATENT DOCUMENTS

| | | |
|---|---|---|
| CN | 105677913 A | 6/2016 |
| CN | 105808768 A | 7/2016 |
| CN | 105808931 A | 7/2016 |
| CN | 105814519 A | 7/2016 |
| CN | 105900081 A | 8/2016 |
| CN | 106492484 A | 3/2017 |
| CN | 103678335 B | 12/2017 |
| CN | 107704480 A | 2/2018 |
| CN | 104765842 B | 5/2018 |
| CN | 108763580 A | 11/2018 |
| TW | I526953 B | 3/2016 |
| TW | I554896 B | 10/2016 |
| TW | I557664 B | 11/2016 |
| TW | I573031 B | 3/2017 |
| TW | 201717126 A | 5/2017 |
| TW | I617930 B | 3/2018 |
| WO | 2017185887 A1 | 11/2017 |
| WO | 2018071525 A1 | 4/2018 |
| WO | 2018081751 A1 | 5/2018 |

* cited by examiner

METHOD FOR ESTABLISHING AND PROCESSING CROSS-LANGUAGE INFORMATION AND CROSS-LANGUAGE INFORMATION SYSTEM

TECHNICAL FIELD

This disclosure relates to a method for establishing and processing cross-language information and a cross-language information system using image and hashtag characteristics.

BACKGROUND

Lives of people become more convenient due to the rapid development of internet, and the online shopping gradually plays an important role in the globalization. The first problem to be faced in the development of globalization is the gap caused by language differences. English is an important international language, however, not all of countries around the world use English as their primary language for communications. When users in different countries find, via internet platforms, interesting information of products, information of concepts or meanings, or local buzzwords from some countries, the users need translation software/tools to realize meanings of text contents of those websites. Moreover, the translations for popular goods are significantly difficult. For example, via the translation software/tools, the word meaning "lotion (e.g. Essence/Serum)" in Chinese is translated into the word meaning "lead liquid" in Korean, but the word meaning "lotion (e.g. Essence/Serum)" in Korean is translated into the word meaning "primer" in Chinese. In other words, the word meaning of a product may be contorted in translation between different languages. Furthermore, there are many social websites and forum websites in various countries and products displayed are often updated. This condition would result in significant time wastes and decreasing user conveniences.

SUMMARY

A method for establishing cross-language information is disclosed according to one embodiment of the present disclosure. The method includes: collecting a plurality of sets of object information from a plurality of network platforms by a processor of a system; by the processor, building a first data structure corresponding to a source language and a second data structure corresponding to a target language according to the plurality of sets of object information; by the processor, classifying a plurality of sets of first object information in the first data structure into a plurality of source image groups according to characteristic data of the plurality of sets of first object information; and by the processor, classifying a plurality of sets of second object information in the second data structure into a plurality of target image groups according to characteristic data of the plurality of sets of second object information; wherein each of the plurality of source image groups comprises a plurality of source hashtag groups, and each of the plurality of target image groups comprises a plurality of target hashtag groups.

A method for processing cross-language information is disclosed according to one embodiment of the present disclosure. The method includes: by a processor of a system, establishing a first data structure corresponding to a source language and a second data structure corresponding to a target language; by an operation interface of a system, receiving a set of target object information, and by the processor, capturing characteristic data of the set of target object information; by the processor, selecting a first related image group from the first data structure corresponding to the source language according to the characteristic data of the set of target object information captured; by the processor, performing a cross-language comparison task according to the first related image group to select a second related image group; by the operation interface, displaying a plurality of candidate object images according to the second related image group; and by the processor, selecting one of the plurality of candidate object images as a final target object image according to a user command; wherein the characteristic data of the set of target object information comprises an image characteristic and a hashtag characteristic.

A cross-language information system adapted to a plurality of network platforms is disclosed according to one embodiment of the present disclosure. The system includes a database, an operation interface and a processor. The database is configured to store a first data structure corresponding to a source language and a second data structure corresponding to a target language; the operation interface is configured to receive a set of target object information. The processor is connected to the database and the operation interface. The processor is configured to capture characteristic data of the set of target object information and select a first related image group from the first data structure corresponding to the source language according to the characteristic data of the set of target object information captured, the processor is configured to perform a cross-language comparison task according to the first related image group to select a second related image group and control the operation interface to display a plurality of candidate object images according to the second related image group, and the processor is further configured to select one of the plurality of candidate object images as a final target object image according to a user command; wherein the characteristic data of the set of target object information comprises an image characteristic and a hashtag characteristic.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
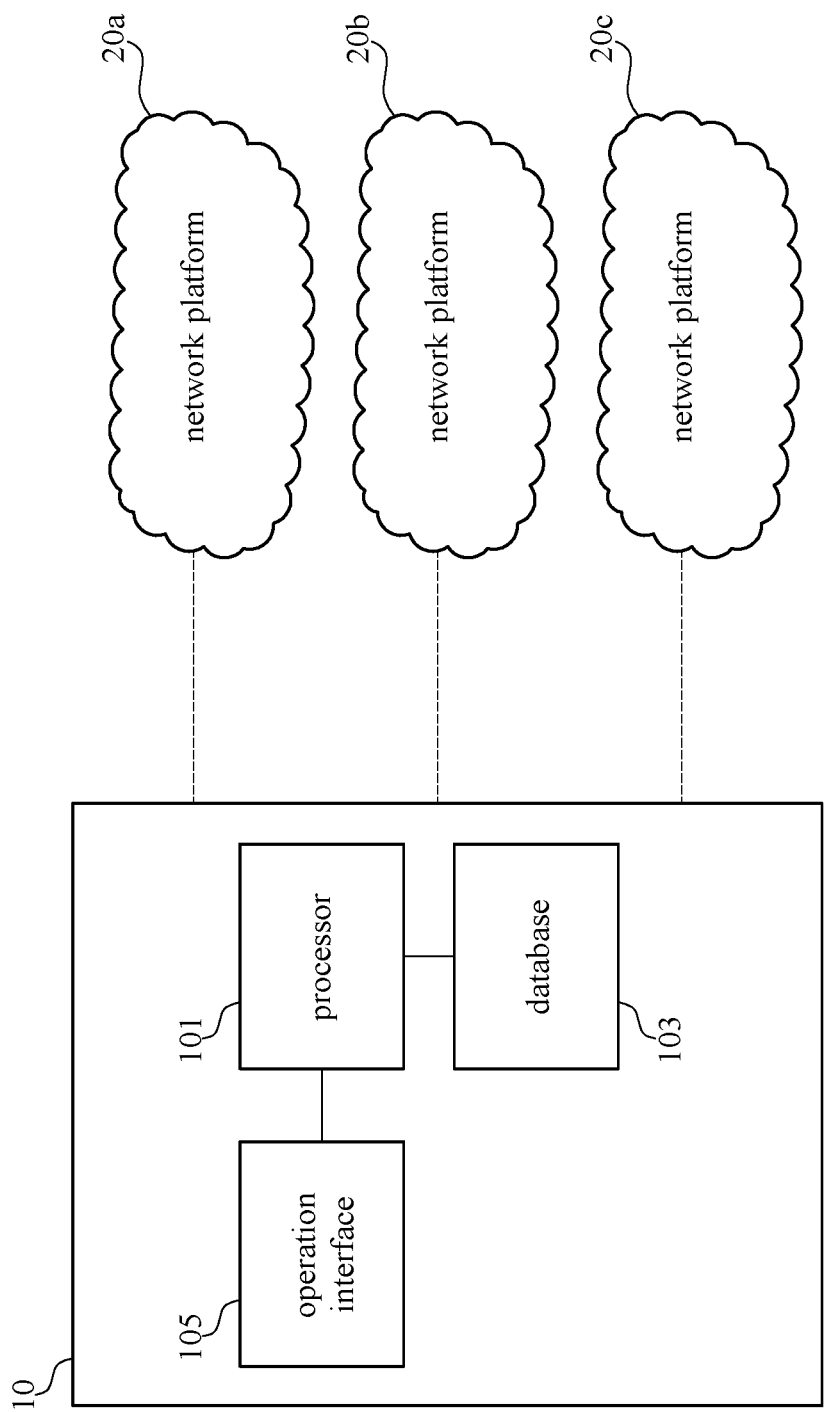
FIG. 1 is a block diagram of a cross-language information system according to one embodiment of the present disclosure.
Figure 2:
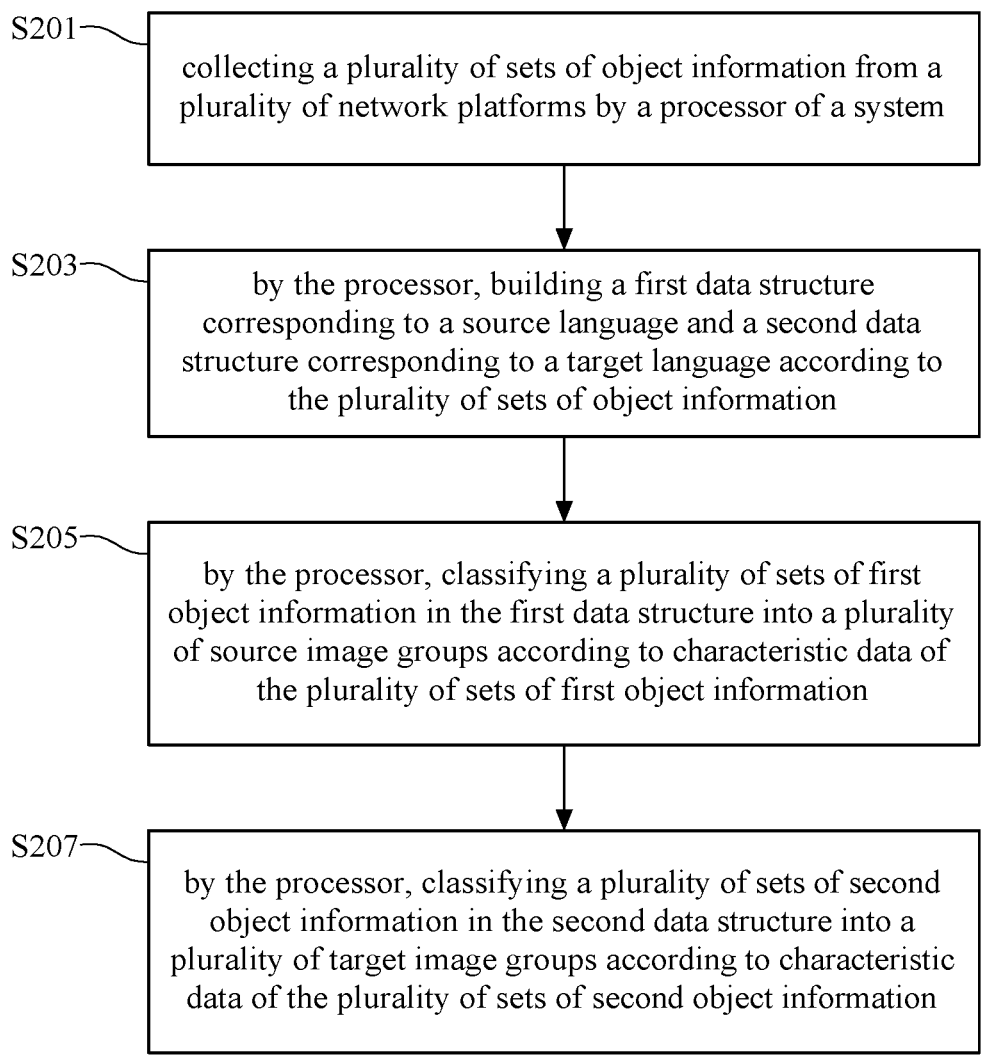
FIG. 2 is a flow chart of a method for establishing cross-language information according to one embodiment of the present disclosure.

Please refer to FIG. 1 and FIG. 2. FIG. 1 is a block diagram of a cross-language information system according to one embodiment of the present disclosure. FIG. 2 is a flow chart of a method for establishing cross-language information according to one embodiment of the present disclosure, wherein the method is implemented by the cross-language information system of FIG. 1. As shown in FIG. 1, a cross-language information system 10 (hereafter "system 10") includes a processor 101, a database 103 and an operation interface 105, wherein the processor 101 is connected to the database 103 and the operation interface 105. In practice, the cross-language information system 10 is a computer system connected to external network platforms 20a-20c via internet. The processor 101 is an element capable of performing computations, such as a central processing unit, a microprocessor, a microcontroller, etc. The network platforms 20a-20c are social network websites or forum websites of countries around the world.

As shown in the method for establishing cross-language of FIG. 2, in step S201, the processor 101 collects a plurality of sets of object information from the network platforms 20a-20c. The plurality of sets of object information includes the information related to a variety of products from different countries, such as cosmetics, computer/communication/consumer electronic products, food, clothing, etc. Please further refer to FIG. 3, which is a diagram of establishment of object information according to one embodiment of the present disclosure. In step S203, the processor 101 builds a first data structure DA1 corresponding to a source language and a second data structure DA2 corresponding to a target language according to the plurality of sets of object information. Specifically, the processor 101 classifies the plurality of sets of object information (e.g. the object information SB1-SB27 and TB1-TB27) based on language categories, so as to form the sets of object information associated with the source language (namely "the first data structure DA1") and the sets of object information associated with the target language (namely "second data structure DA2"). In one example, the source language is the native language of a user (e.g. Chinese language) while the target language is another language (e.g. Korean language) different from the native language of the user. However, the present disclosure is not limited to the above example.

In step S205, the processor classifies a plurality sets of first object information SB1-SB27 in the first data structure DA1 into a plurality of source image groups such as SG1-SG3 according to characteristic data of the plurality of sets of first object information SB1-SB27. The present disclosure is not limited to the above embodiment. Each of the source image groups SG1-SG3 includes a plurality of source hashtag groups. For example, the source image group SG1 includes a plurality of source hashtag groups SHG1-SHG3, the source image group SG2 includes a plurality of source hashtag groups SHG4-SHG6, and the source image group SG3 includes a plurality of source hashtag groups SHG7-SHG9. The present disclosure is not limited to the above embodiment.

In step S207, the processor 101 classifies a plurality of sets of second object information TB1-TB27 in the second data structure DA2 into a plurality of target image groups TG1-TG3 according to characteristic data of the plurality of sets of second object information TB1-TB27. Each of the target image groups TG1-TG3 includes a plurality of target hashtag groups. For example, the target image group TG1 includes a plurality of target hashtag groups THG1-THG3, the target image group TG2 includes a plurality of target hashtag groups THG4-THG6, and the target image group TG3 includes a plurality of target hashtag groups THG7-THG9.

In one embodiment, the characteristic data of the plurality sets of first object information SB1-SB27 includes a plurality of pieces of first image data and a plurality of pieces of first hashtag data, and the characteristic data of the plurality sets of second object information TB1-TB27 includes a plurality of pieces of second image data and a plurality of pieces of second hashtag data. In more details, the characteristic data of each of the first and the second object information includes the corresponding image data/hashtag data. The image data includes image characteristics of those object information such as shapes, colors, contours. The hashtag data includes one or more characters indicating meanings of the object information. In practice, the processor 101 captures the characteristic data (e.g. the image data) of the object information by using the technique of Convolutional Neural Network (CNN), and the processor 101 further performs the above image/hashtag classification by using the technique of Density-Based Spatial Clustering of Applications with Noise (DBSCAN). However, the present disclosure is not limited to the above example. The plurality of image groups each having hashtag groups in the data structure of the cross-language building shown in FIG. 3 can be formed by capturing the image/hashtag characteristics by the processor 101. The processor 101 further stores the image groups each having hashtag groups in the database 103, so that a user is able to perform a search/comparison for a set of target object information.

Figure 3:
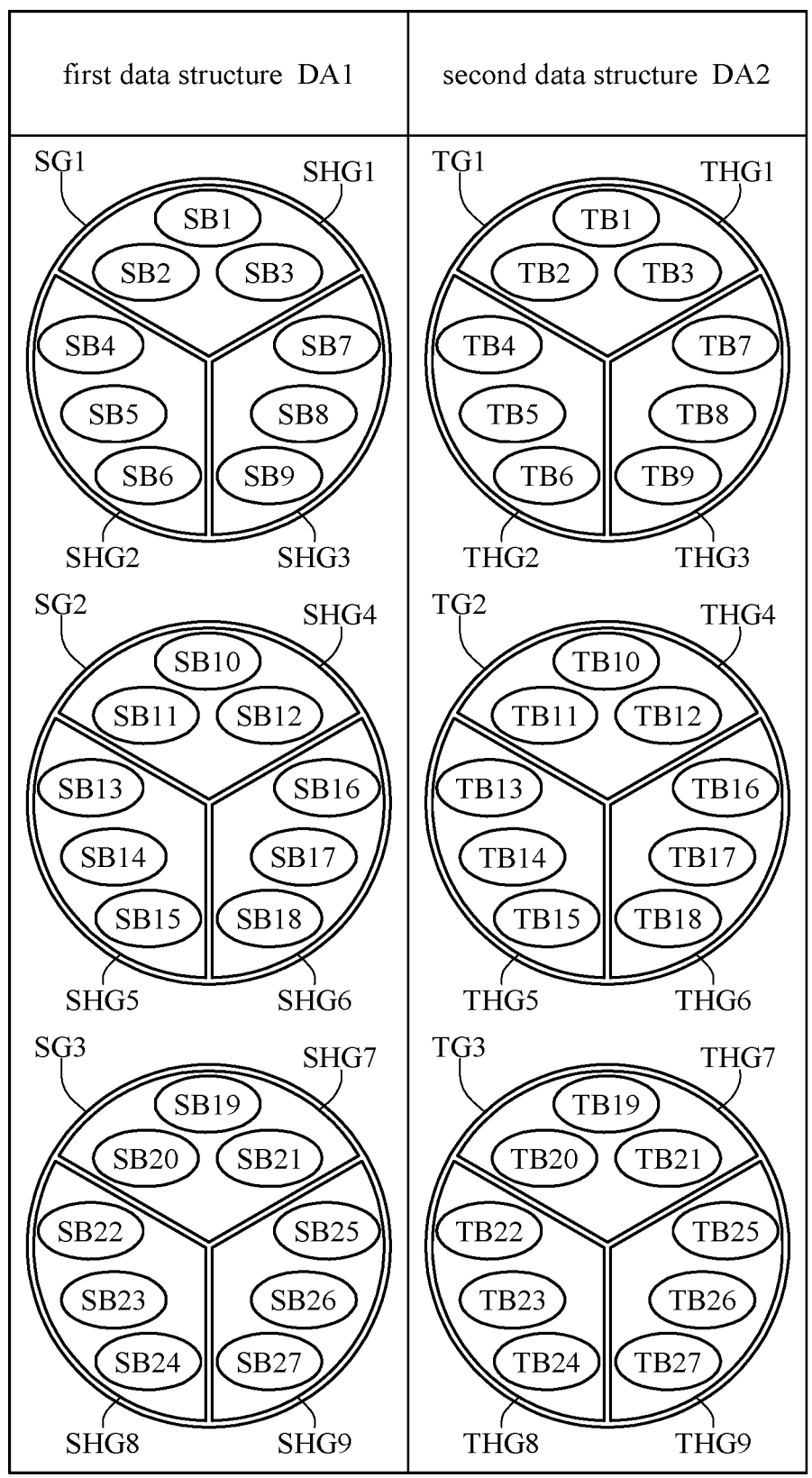
FIG. 3 is a diagram of establishment of object information according to one embodiment of the present disclosure.

In one embodiment, classifying the plurality of sets of first object information SB1-SB27 in the first data structure DA1 into the plurality of source image groups SG1-SG3 according to the characteristic data of the plurality sets of first object information by the processor 101 includes: the processor 101 performs an image-classification task for the plurality sets of first object information SB1-SB27 according to the plurality pieces of first image data to form the plurality of source image groups SG1-SG3. The sets of first object information in each source image group have first image characteristics identical to one another. In more details, the processor 101 takes the sets of first object information which have the identical or similar first image characteristics into the same source image group. As shown in FIG. 3, since the sets of first object information SB1-SB9 have the identical or similar first image characteristics, the sets of first object information SB1-SB9 are taken into the source image group SG1. Similarly, since the sets of first object information SB10-SB18 have the identical or similar first image characteristics, the sets of first object information SB10-SB18 are taken into the source image group SG2. Since the sets of first object information SB19-SB27 have the identical or similar first image characteristics, the sets of first object information SB19-SB27 are taken into the source image group SG3.

In one embodiment, classifying the plurality of sets of second object information TB1-TB27 in the second data structure DA2 into the plurality of target image groups TG1-TG3 according to the characteristic data of the plurality of sets of second object information TB1-TB27 by the processor 101 includes: the processor 101 performs an image-classification task for the plurality sets of object information TB1-TB27 according to the plurality pieces of second image data to form the plurality of target image groups TG1-TG3. The sets of object information in each target image group have second image characteristics identical to one another. In more details, the processor 101 takes the sets of second information which have the identical or similar second image characteristics into the same the same target image group. As shown in FIG. 3, since the sets of second object information TB1-TB9 have the identical or similar second image characteristics, the sets of second object information TB1-TB9 are taken into the source image group TG1. Similarly, since the sets of second object information TB10-TB18 have the identical or similar second image characteristics, the sets of second object information TB10-TB18 are taken into the source image group TG2. Since the sets of second object information TB19-TB27 have the identical or similar second image characteristics, the sets of second object information TB19-TB27 are taken into the source image group TG3.

In one embodiment, the method for establishing cross-language information of the present disclosure further includes: the processor 101 performs a hashtag-classification task for the sets of first object information in each source image group according to a plurality of pieces of first hashtag data of the sets of first object information SB1-SB27 for forming the plurality of sets of source hashtag groups SHG1-SHG9, wherein the sets of first object information in each source hashtag group have identical first hashtag characteristics. Specifically, in the hashtag-classification task, the processor 101 takes the sets of first object information in each source image, which have the identical first hashtag data group, to the same source hashtag group. In other words, the first hashtag data of the sets of first object information in the same source hashtag group have the same or similar word meaning. Take the source image group SG1 of the embodiment of FIG. 3 as an example, the sets of first object information SB1-SB3 have identical first hashtag data, so the processor 101 takes the sets of first object information SB1-SB3 to the same source hashtag group SHG1. Similarly, the sets of first object information SB4-SB6 have identical first hashtag data, the processor 101 takes the sets of first object information SB4-SB6 to the same source hashtag group SHG2. The sets of first object information SB7-SB9 have identical first hashtag data, the processor 101 takes the sets of first object information SB7~SB9 to the same source hashtag group SHG3. The same principle can be applied to the source image group SG2 and the source image group SG3.

In one embodiment, the method for establishing cross-language information further includes: the processor 101 performs a hashtag-classification task for the sets of second object information in each target image group according to a plurality of pieces of second hashtag data of the sets of second object information TB1-TB27 for forming the plurality of target hashtag groups THG1-THG9, wherein the sets of second object information in each target hashtag group have identical second hashtag characteristics. Specifically, in the hashtag-classification task, the processor 101 takes the sets of second object information in each target image group, which have identical second hashtag data, to the same target hashtag group. Take the target image group TG1 of the embodiment of FIG. 3 as an example, the sets of second object information TB1-TB3 have identical second hashtag data, so the processor 101 takes the sets of second object information TB1-TB3 to the same target hashtag group THG1. Similarly, the sets of second object information TB4-TB6 have identical second hashtag data, so the processor 101 takes the sets of second object information TB4-TB6 to the same target hashtag group THG2. The sets of second object information TB7-TB9 have identical second hashtag data, so the processor 101 takes the sets of second object information TB7-TB9 to the same target hashtag group THG3. The same principle can be applied to the target image group TG2 and the target image group TG3.

In view of the aforementioned embodiments, the system of the present disclosure first builds the database. In other words, the system establishes two different data structures corresponding to the source language and the target language respectively by performing an initial classification based on language categories. Then, the system performs the image-classification and the hashtag-classification for the two data structures, so that the huge amount of object information can be classified, based on the image/hashtag characteristics, into data groups having different characteristics for the user to perform a comparison for a set of target object information. The detailed descriptions associated with steps of using the database to perform a comparison/search for a specific target object will be introduced in the following paragraphs.

Figure 4:
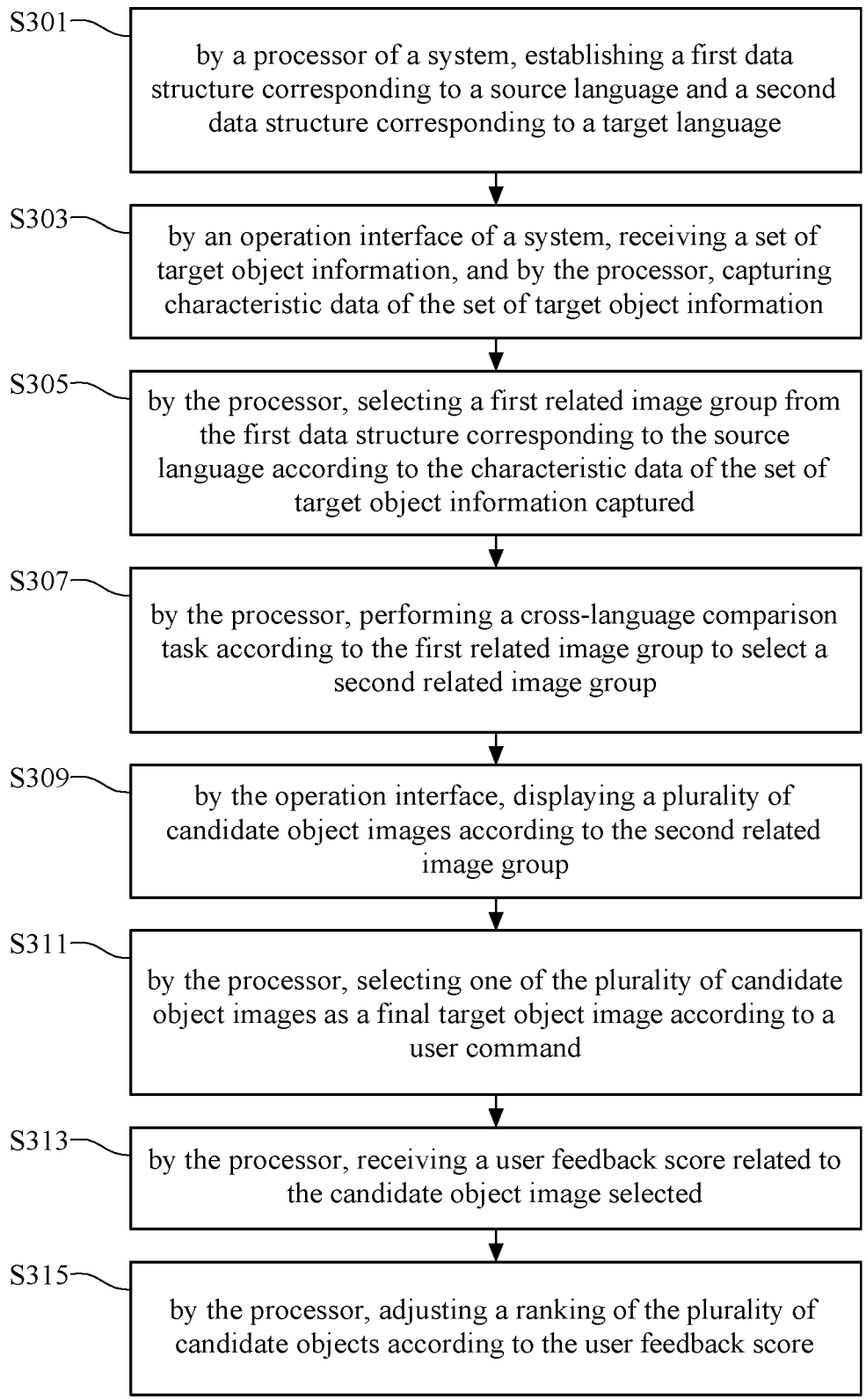
FIG. 4 is a flow chart of a method for processing cross-language information according to one embodiment of the present disclosure.

Please refer to FIG. 1, FIG. 3 and FIG. 4. FIG. 4 is a flow chart of a method for processing cross-language information according to one embodiment of the present disclosure, wherein the method is implemented by the cross-language information system of FIG. 1. As shown in FIG. 4, in step S301, the processor 101 of the system 10 builds the first data structure DA1 corresponding to the source language (e.g. Chinese language) and the second data structure DA2 corresponding to the target language (e.g. Korea language), and further stores the two data structure which have classified image/hashtag groups in the database 103. The method for processing cross-language information in the embodiment of FIG. 4 further includes performing the image-classification task and the hashtag-classification task for the sets of first object information and the sets of second object information, so as to form the source image/hashtag groups as well as the target image/hashtag groups shown in FIG. 3. The detailed steps of the above classifications have been introduced in the aforementioned embodiments, and not repeated here. The following paragraphs will focus on the comparison/search for a specific target object by using the database.

In step S303, the operation interface 105 of the system 10 receives a set of target object information and captures characteristic data of the set of target object information. In an implementation, a user inputs the set of target object information (e.g. image/characters) via the operation interface 105, wherein the characteristic data of the set of target object information includes one or more image characteristics and hashtag characteristics associated with the set of target object information. For example, the set of target object information is a bottle of shower gel, and the processor 101 of the system 10 captures the image characteristics of the set of target object information (the bottle of shower gel) such as bottle shapes, colors of contents, etc. Besides, the processor 101 of the system 10 further captures the hashtag characteristics of the set of target object information (the bottle of shower gel), wherein the hashtag characteristics includes characters with meaning related to the set of target object such as #gel, #milky, #bubble, #moisturization, #fragrance, etc.

In step S305, the processor 101 of the system 10 selects a first related image group from the first data structure DA1 corresponding to the source language according to the characteristic data of the set of object information captured. In step S307, the processor 101 of the system 10 performs a cross-language comparison task to select a second related image group from the second data structure DA2 corresponding to the target language according to the first related image group.

In one embodiment, by the processor 101 of the system 10, selecting the first related image group from the first data structure DA1 corresponding to the source language according to the characteristic data of the set of object information captured includes: the processor 101 of the system 10 selects one of source image groups SG1-SG3 in the first data structure DA1 as the first related image group, wherein a first image characteristic of the source image group selected matches the image characteristic of the set of target object information. More specifically, based on the image characteristic of the set of target object information, the processor 101 of the system 10 searches for the source image group among the source image groups SG1-SG3, which corresponds to the image characteristic of the set of target object information.

For example, the source image groups SG1-SG3 have the first image characteristics respectively such as a shape of bottle, a shape of electronic device and a shape of food bag. Since the image characteristic of the set of target object information (the bottle of shower gel) is a shape of bottle, the system 10 would select the source image group SG1 as the first related image group. In more detail, the method for processing cross-language information not only includes the image comparison but also includes the hashtag comparison, so the system 10 further obtains the information indicating that which one of the first source hashtag groups in the first related image group corresponds to the set of target object information according to the hashtag characteristic of the set of target object information. Therefore, the system 10 is capable of accurately finding the first related image group without finding the wrong source image group as the first related image group due to image comparison errors. The above examples and embodiments are merely for illustration, and the present disclosure is not limited to the above examples and embodiments.

In one embodiment, the cross-language comparison task includes that: the processor 101 of the system 10 selects one of the target image groups TG1-TG3 in the second data structure DA2 corresponding to the target language as the second related image group according to the first image characteristic of the source image group (e.g. the source image group SG1) serving as the first related image group, wherein the second image characteristic of the target image group which is selected matches the first image characteristic of the source image group which is selected. More specifically, assume that the target image groups TG1-TG3 have the second image characteristics respectively such as a shape of barrel, a shape of bottle, a shape of bag. Since the target image group TG2 and the first related image group have identical image characteristic, the processor 101 of the system 10 selects the target image group TG2 as the second related image group.

In step S309, the system 10 displays a plurality of candidate object images according to the second related image group. The plurality of candidate object images are the set of second object information of the second related image group. In the aforementioned example, the operation interface 105 of the system 10 displays the sets of second object information TB4-TB6 of the target image group TG2 which serves as the second related image group.

In step S311, the system 10 selects one of the plurality of candidate object images as a final target object image according to a user command. More specifically, the user controls the operation interface 105 to send out the user command for selecting one of the sets of second object information TB4-TB6, which mostly matches the set of target object information. In practice, the operation interface 105 of the system 10 is also capable of displaying the hashtag characteristic of the set of second object information which is selected, wherein the hashtag characteristic includes the word meaning of the set of second object information in the target language (e.g. Korean language). Since the word meaning of the set of target object information is presented in the source language (e.g. Chinese language) of the user, the user is able to realize the word meaning of the set of second object information in the target language based on the word meaning of the set of target object information in the source language when the system 10 displaying the set of second object information with the word meaning in the target language.

In one embodiment, the method for processing cross-language information further includes: in step S313, the operation interface 105 of the system 10 receives a user feedback score associated with the candidate object image which is selected. In an example, when the user thinks that the set of second object information TB5 mostly matches the set of target object information, the user controls the operation interface 105 to send a user command for selecting the set of second object information TB5 as the final target object image. The user further gives the user feedback score to the system 10 for the set of second object information TB5. In one embodiment, the method for processing cross-language information further includes: in step S315, the system 10 adjusts a ranking of the outputted candidate object images according to the user feedback score.

More specifically, after completing the comparison task, the processor 101 of the system 10 drives the operation interface 105 to output the candidate object images in an initial ranking. For example, via the operation interface 105, the sets of second object information TB4, TB5 and TB6 are outputted sequentially based on their weights. When the user selects the set of second object information TB5 as the final target object image, the processor 101 of the system 10 would receive the user feedback score. The processor 101 of the system 10 further adds the user feedback score to the original weight of the sets of second object information TB5. In this condition, the weight of the sets of second object information TB5 will be increased. When the user inputs the identical or similar target object information next time, the processor 101 of the system 10 properly adjusts the ranking of outputting the candidate object images in consideration of the user feedback score. For example, a rank of the sets of second object information TB5, TB4 and TB6 might be presented.

Based on the above descriptions, in the method for establishing and process cross-language information, a specific processing technique is applied to the plurality of sets of object information by a specific computer system ("the system 10"), wherein the specific processing technique includes building a database including images and hashtags of a variety of objects and capturing the image characteristics and hashtag characteristics of the target object information, and further coming with a specific comparison technique to search the database with different languages for outputting the plurality of sets of candidate object information in order for the user to select. Moreover, the user is allowed to give a feedback score to the system. Therefore, a mechanism of a high accurate cross-language search can be established based on the classification and comparison, and accordingly the user receives the target object information (e.g. product information of social network websites or online-shopping websites) corresponding to languages of different countries. In other words, a set of single target object information can be presented in different language systems in the present disclosure, so the difficulty of translations between different languages can be overcome.

What is claimed is:

1. A method for establishing cross-language information, comprising:

collecting a plurality of object information sets from a plurality of network platforms by a processor of a system;

by the processor, building a first data structure corresponding to a source language and a second data structure corresponding to a target language according to the plurality of object information sets, wherein the plurality of object information sets is composed of a plurality of first object information sets and a plurality of second object information sets, characteristic data of the plurality of first object information sets comprises a plurality of pieces of first image data and a plurality of pieces of first hashtag data, and characteristic data of the plurality of second object information sets comprises a plurality of pieces of second image data and a plurality of pieces of second hashtag data;

by the processor, performing an image-classification task for the plurality of first object information sets according to the plurality of pieces of first image data to form a plurality of source image groups, wherein the plurality of first object information sets in each of the plurality of source image groups have identical first image characteristics; and by the processor, performing the image-classification task for the plurality of second object information sets according to the plurality of pieces of second image data to form a plurality of target image groups, wherein the plurality of second object information sets in each of the plurality of target image groups have identical second image characteristics;

wherein each of the plurality of source image groups comprises a plurality of source hashtag groups, and each of the plurality of target image groups comprises a plurality of target hashtag groups.

2. The method for establishing cross-language information according to claim 1, further comprising:

by the processor, performing a hashtag-classification task for the plurality of first object information sets in each of the plurality of source image groups according to the plurality of pieces of first hashtag data to form the plurality of source hashtag groups, wherein the plurality of first object information sets in each of the plurality of source hashtag groups have identical first hashtag characteristics.

3. The method for establishing cross-language information according to claim 1, further comprising:

by the processor, performing a hashtag-classification task for the plurality of second object information sets in each of the plurality of target image groups according to the plurality of pieces of second hashtag data to form the plurality of target hashtag groups, wherein the plurality of second object information sets in each of the plurality of target hashtag groups have identical second hashtag characteristics.

4. A method for processing cross-language information, comprising:

collecting a plurality of object information sets from a plurality of network platforms by a processor of a system;

by the processor, establishing a first data structure corresponding to a source language and a second data structure corresponding to a target language according to a plurality of object information sets, wherein the plurality of object information sets is composed of a plurality of first object information sets and a plurality of second object information sets, characteristic data of the plurality of first object information sets comprises a plurality of pieces of first image data and a plurality of pieces of first hashtag data, and characteristic data of the plurality of second object information sets comprises a plurality of pieces of second image data and a plurality of pieces of second hashtag data;

by the processor, performing an image-classification task for the plurality of first object information sets according to the plurality of pieces of first image data to form a plurality of source image groups, wherein the plurality of first object information sets in each of the plurality of source image groups have identical first image characteristics; and by the processor, performing the image-classification task for the plurality of second object information sets according to the plurality of pieces of second image data to form a plurality of target image groups, wherein the plurality of second object information sets in each of the plurality of target image groups have identical second image characteristics;

by an operation interface of a system, receiving a set of target object information, and by the processor, capturing characteristic data of the set of target object information;

by the processor, selecting a first related image group from the first data structure corresponding to the source language according to the characteristic data of the set of target object information captured;

by the processor, performing a cross-language comparison task according to the first related image group to select a second related image group;

by the operation interface, displaying a plurality of candidate object images according to the second related image group; and by the processor, selecting one of the plurality of candidate object images as a final target object image according to a user command;

wherein the characteristic data of the set of target object information comprises an image characteristic and a hashtag characteristic.

5. The method for processing cross-language information according to claim 4, wherein by the processor, selecting the first related image group from the first data structure corresponding to the source language according to the characteristic data of the set of target object information captured comprising:

by the processor, selecting one of the plurality of source image groups in the first data structure as the first related image group, wherein a first image characteristic of the source image group selected matches the image characteristic of the set of target object information.

6. The method for processing cross-language information according to claim 5, wherein the cross-language comparison task comprising:

by the processor, selecting one of the plurality of target image groups in the second data structure corresponding to the target language as the second related image group according to the first image characteristic of the source image group serving as the first related image group, wherein a second image characteristic of the target image group selected matches the first image characteristic of the source image group selected.

7. The method for processing cross-language information according to claim 4, further comprising:
by the processor, performing a hashtag-classification task according to a plurality of pieces of first hashtag data of the plurality of first object information sets in each of the plurality of source image groups to form a plurality of source hashtag groups, wherein the plurality of first object information sets in each of the plurality of source hashtag groups have identical first hashtag characteristics.

8. The method for processing cross-language information according to claim 4, further:
by the processor, performing a hashtag-classification task according to a plurality of pieces of second hashtag data of the plurality of second object information sets in each of the plurality of target image groups to form a plurality of target hashtag groups, wherein the plurality of second object information sets in each of the plurality of target hashtag groups have identical second hashtag characteristics.

9. The method for processing cross-language information according to claim 4, further comprising:
by the processor, receiving a user feedback score related to the candidate object image selected.

10. The method for processing cross-language information according to claim 9, further comprising:
by the processor, adjusting a ranking of the plurality of candidate objects according to the user feedback score.

11. A cross-language information system, adapted to a plurality of network platforms, the cross-language information system comprising:
a database configured to store a first data structure corresponding to a source language and a second data structure corresponding to a target language;
an operation interface configured to receive a set of target object information;
a hardware processor connected to the database and the operation interface, with the processor configured to capture characteristic data of the set of target object information and select a first related image group from the first data structure corresponding to the source language according to the characteristic data of the set of target object information captured, the hardware processor configured to perform a cross-language comparison task according to the first related image group to select a second related image group and control the operation interface to display a plurality of candidate object images according to the second related image group, the processor further configured to select one of the plurality of candidate object images as a final target object image according to a user command;
wherein the characteristic data of the set of target object information comprises an image characteristic and a hashtag characteristic;
wherein the hardware processor forms a plurality of source image groups by performing an image-classification task for a plurality of first object information sets in the first data structure according to a plurality of pieces of first image data of the plurality of first object information sets, wherein the plurality of first object information sets in each of the plurality of source image groups have identical the first image characteristics, the hardware processor forms a plurality of target image groups by performing the image-classification task for a plurality of second object information sets in the second data structure according to a plurality of pieces of second image data of the plurality of second object information sets, wherein the plurality of second object information sets in each of the plurality of target image groups have identical the second image characteristics.

12. The cross-language information system according to claim 11, wherein the first related image group is one of the plurality of source image groups, which is selected by the hardware processor from the first data structure, and a first image characteristic of the source image group selected matches the image characteristic of the set of target object information.

13. The cross-language information system according to claim 12, wherein the cross-language comparison task comprises: the hardware processor selects one of the plurality of target image groups in the second data structure corresponding to the target language as the second related image group according to the first image characteristic of the source image group serving as the first related image group, wherein a second image characteristic of the target image group selected matches the first image characteristic of the source image group selected.

14. The cross-language information system according to claim 11, wherein the hardware processor is further configured to perform a hashtag-classification task to form a plurality of target hashtag groups according to a plurality of second hashtag information sets of the plurality of second object information sets in each of the plurality of target image groups, wherein the plurality of second object information sets in each of the plurality of target hashtag groups have identical second hashtag characteristics.

15. The cross-language information system according to claim 11, wherein the hardware processor is further configured to perform a hashtag-classification task to form a plurality of source hashtag groups according to a plurality of first hashtag information sets of the plurality of first object information sets in each of the plurality of source image groups, wherein the plurality of first object information sets in each of the plurality of source hashtag groups have identical first hashtag characteristics.

16. The cross-language information system according to claim 11, wherein the operation interface is further configured to receive a user feedback score related to the candidate object image selected.

17. The cross-language information system according to claim 16, wherein the hardware processor is further configured to adjust a ranking of the plurality of candidate object images according to the user feedback score.

* * * * *